Patented May 3, 1932

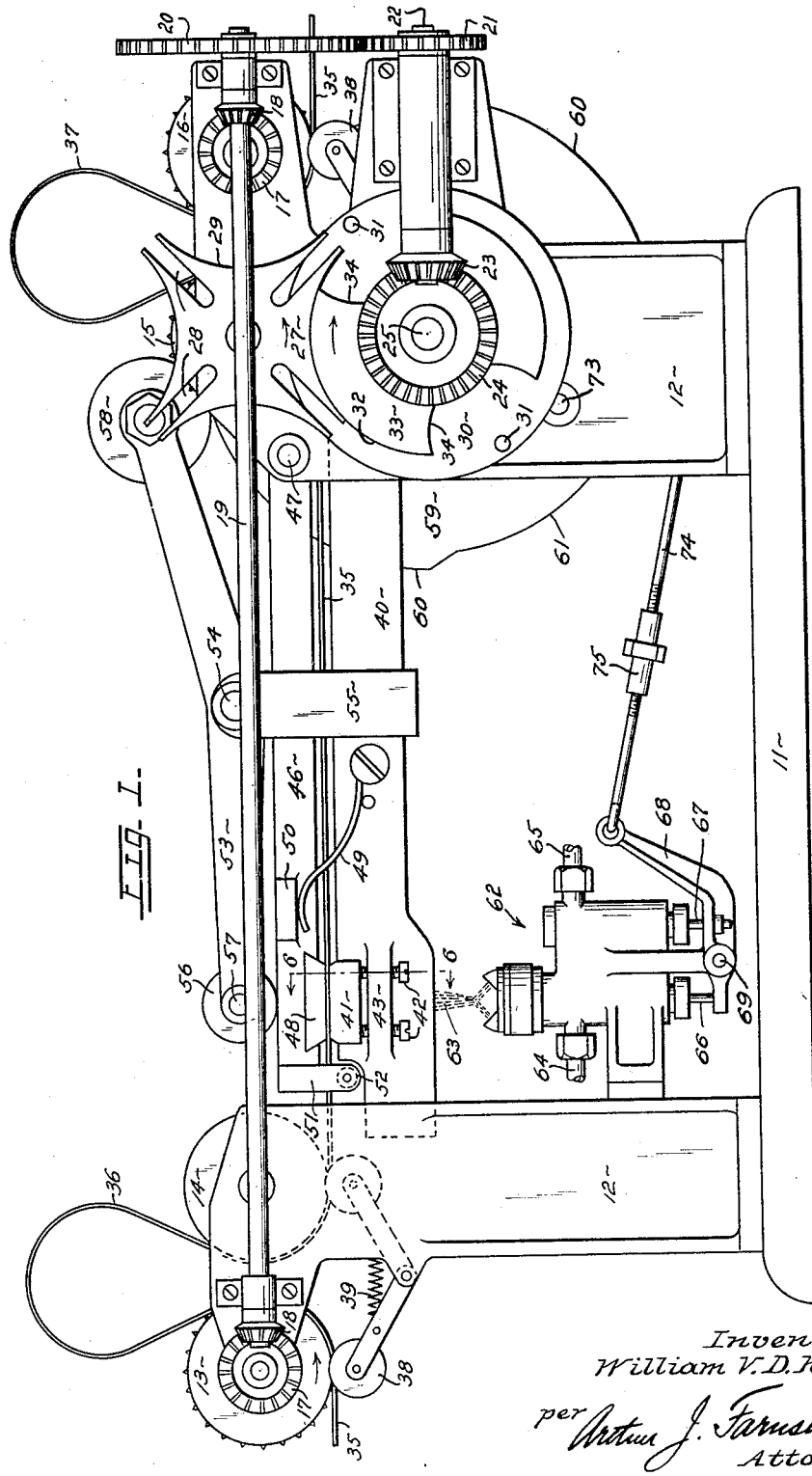

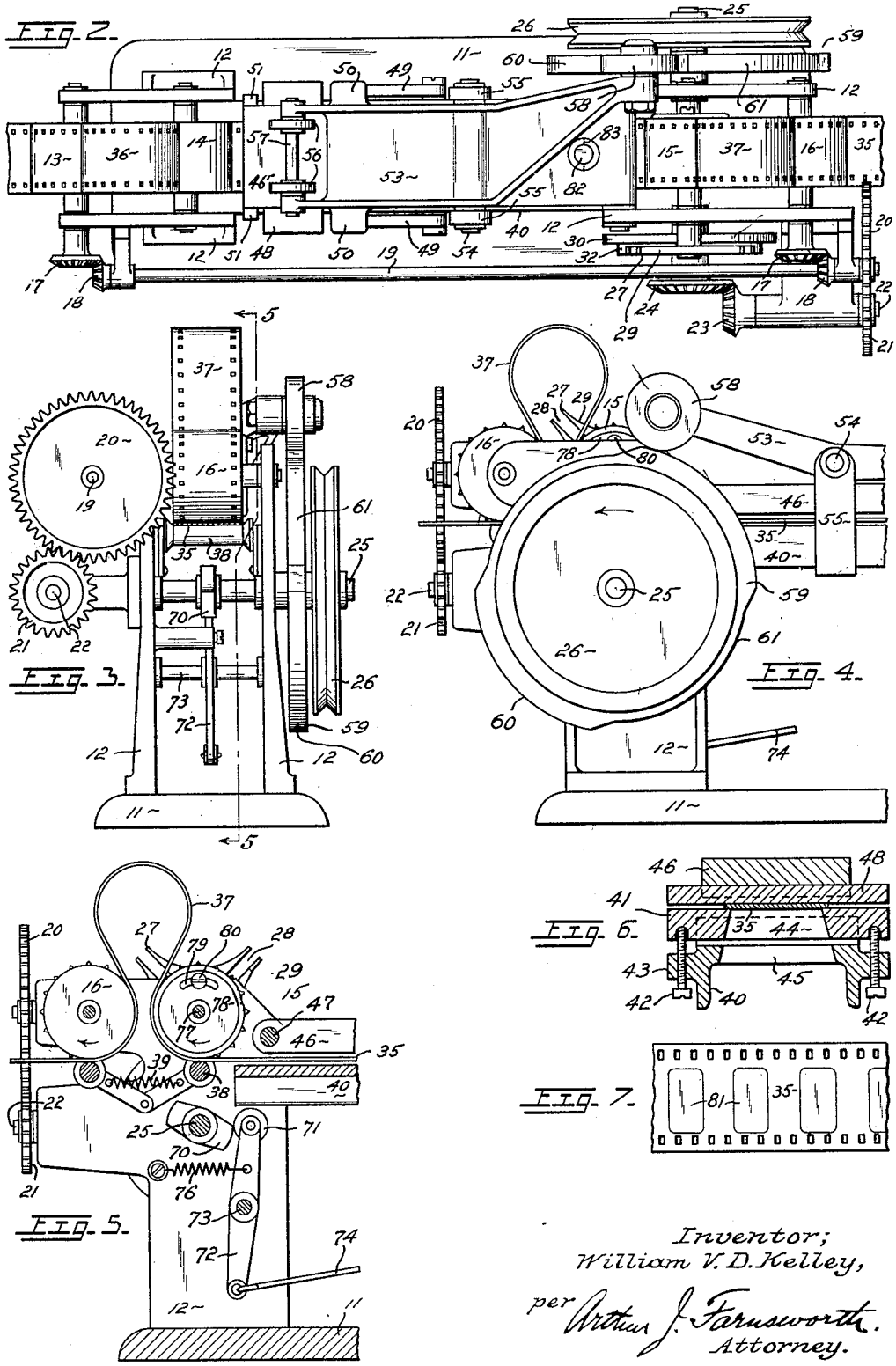

1,856,390

UNITED STATES PATENT OFFICE

WILLIAM V. D. KELLEY, OF HOLLYWOOD, CALIFORNIA, ASSIGNOR OF ONE-HALF TO G. ALLAN HANCOCK, OF LOS ANGELES, CALIFORNIA

FILM-TREATING APPARATUS

Application filed December 3, 1930. Serial No. 499,688.

In this specification, and the accompanying drawings I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for coating or otherwise treating, spaced pre-determined areas of photographic films. Among its principal objects are; first, to provide automatic means for uniformly coating or treating, uniformly spaced and shaped areas of photographic films, as by means of spraying; second, to supply a practical method for sharply defining the limits of said treated areas; third, to furnish facilities for accomplishing the above results by means of a substantially continuous process; and fourth, to devise simple apparatus that is well adapted for performing the above functions.

My objects are attained in the manner illustrated in the accompanying drawings, in which:

Figure 1 is an elevation of the front side of my apparatus, showing a film strip being treated therein;

Figure 2 is a plan view of the aforesaid apparatus and film;

Figure 3 is an elevation of the right hand end of the apparatus shown in Figs. 1 and 2;

Figure 4 is a rear elevation of the right hand end of said apparatus;

Figure 5 is an elevational section of the apparatus, taken on the line 5—5 of Fig. 3;

Figure 6 is a detail cross-section, taken on the line 6—6 of Fig. 1; and,

Figure 7 is a plan view illustrating the manner in which photographic films may be treated by the use of my apparatus.

Figures 1, 6 and 7 are drawn to approximately the same scale, and the remaining figures are drawn to a reduced scale. Similar reference numerals refer to similar parts throughout the several views.

In the practice of such arts as color photography applied to motion picture films, it is often necessary to specially treat alternate or uniformly spaced areas thereof. As an example, it may happen that a film as originally prepared was uniformly colored, and it may then be necessary to give alternate frames of the film an impervious transparent coating that is adapted to protect the color, so that the color in the remaining portions of the film may be bleached out, or so that the remaining portions of the film may be given a different complementary color. As another instance, it might be mentioned that, after a film has been completed, it may be found desirable to slightly alter or otherwise treat its alternate picture areas.

It is well known in the art that spraying is one of the most practical and successful methods of accomplishing such treatments as those mentioned. My apparatus is especially adapted for treating sharply defined and uniformly spaced areas of a film by means of spraying; to apply either a protective coating such as lacquer, coloring fluids, or fluids adapted for performing certain chemical reactions. The only limitation to the use of fluids for such purposes, by means of my apparatus, is that they must be readily capable of atomization, and be volatile in nature, or be capable of so affecting the film as to cause it to dry rather quickly. Ordinary lacquers constitute a type of fluid that my apparatus is particularly well adapted to apply in the manner indicated.

The underlying principle upon which my apparatus is based, consists in feeding the film through it in a uniformly intermittent manner, the film being gripped and sprayed through a stencil during the intermittent periods while it is not in motion.

Passing to a detailed description of the particular embodiment of my invention that I have selected for illustration, I provide a base 11 upon which suitably spaced pairs of opposed pedestals 12 are mounted at the respective ends. Between the left hand pair of pedestals, at the top thereof, is a pair of rotatable film rollers 13 and 14. Roller 13 is provided with sprocket teeth for engaging a film, and roller 14 may be in the form of a plain cylinder. Similarly, I provide a pair of rotatable rollers 15 and 16 between the right hand pair of pedestals, both of the latter rollers being provided with sprocket teeth for engaging films. The forward ends of the shafts of rollers 13 and 16 are provided with mitre gears 17. These gears engage mitre pinions 18, and the latter are mounted upon a common shaft 19 so as to turn together in the same direction. The gear ratio of the respective pairs of mitre pinions and gears is the same, so that rollers 13 and 16 will be caused to rotate at the same speed by rotating pinion shaft 19. The rotation of this shaft is accomplished by means of a spur gear 20 affixed thereto, and driven by spur pinion 21 meshing therewith. Pinion 21 is affixed to a shaft 22, at the other end of which is a mitre pinion 23 meshing with the mitre gear 24. The latter gear is mounted upon a drive shaft 25 that extends through bearings in the right hand pair of pedestals, and upon the rear end of this shaft there is a V-pulley 26, by which power may be applied for operating the machine.

When power is applied to uniformly rotate pulley 26, the aforesaid gear trains will uniformly rotate rollers 13 and 16. Roller 14 is not driven, and acts merely to position and guide the film while it is passing through the machine. Roller 15 is driven intermittently, starting and stopping alternately for prescribed periods, but accomplishing a complete revolution in the same length of time that is required for rollers 13 and 16. There are several ways for accomplishing this intermittent rotation of roller 15, as by the use of claw mechanisms, or by mutilated gears. A simple and satisfactory method is to make use of the modified Geneva mechanism depicted, this being arranged for continuous operation. This mechanism comprises a star wheel 27 that is affixed upon the shaft of film roller 15. The star wheel has four radially disposed slots 28 at right angles to the adjacent slots, and circular concave peripheral portions 29 extending between the slots. The co-operating element of this intermittent mechanism comprises a two-step cone disc 30, affixed to driving shaft 25. The larger disc of this cone carries two diametrically disposed pins 31, projecting from its outer face near its periphery, and so located as to engage slots 28 when the disc is revolved, for rotating star wheel 27. Peripheral portions 32 of the smaller disc 33 are adapted to engage the concave peripheral portions of star wheel 27, and thus keep the star wheel from rotating except when it is engaged by pins 31; and they are cut away at 34, to provide the necessary clearance for the points of star wheel 27, during the times it rotates.

The mechanism illustrated functions to cause star wheel 27 to make two quarter revolutions, with intermediate periods of rest of approximately the same duration, for each revolution of shaft 25. Thus, when shaft 25 makes one turn, roller 15 makes a half turn in steps of two quarter revolutions and two interposed rest periods. The ratio of pinion 21 to gear 20 is made one to two, and the ratio of gears 17 and pinions 18 is the same as the ratio of pinion 23 and gear 24. Thus rollers 13 and 16 will also make a half revolution for each revolution of driving shaft 25.

Film 35 is threaded through the machine in such a manner that there is a sufficient upstanding loop 36 between rollers 13 and 14 and a similar loop 37 between rollers 15 and 16. Retractable contact rolls 38, of any ordinary and suitable type, are constrained as by means of springs 39 to keep the film in contact and mesh with the respective rollers 13 to 16 inclusive. A continuous rotation of pulley 26 will thus cause the film to be pulled into the machine at a continuous speed by roller 13, and to be fed out of the machine at the same continuous speed by roller 16. Between these rollers an intermittent longitudinal motion is given to the film by means of roller 15, the film being caused to alternately move and remain at rest for substantially similar periods, and ultimately progressing it at the same rate that it comes into the machine and is discharged therefrom. This intermittent motion of the film within the machine is made possible by loops 36 and 37, which alternately expand and contract in size.

The intermittent motion of the film, by reason of the periods during which it is at rest, allows of treating spaced areas thereof by spraying or otherwise. This, as stated above, is the primary purpose of the machine.

Extending between the pedestals 12 and the pairs thereof, there is a horizontal bed plate 40. This is located just below the horizontal portion of film 35, and is preferably made of channel section for supplying the necessary rigidity coupled with lightness. At the left hand end of the bed plate, fitting a transverse channel formed therein, is a combination platen and stencil block 41. This is preferably supported in such a manner that its elevation is adjustable, as by means of screws 42 that extend through lugs 43 at the respective sides of the bed plate, and it is provided with a central opening shown at 44 in Fig. 6. A similar opening 45 is provided in the bed plate, just below the opening through the stencil. Thus a portion of the under surface of the film is exposed, and through these openings the film may be sprayed or treated.

Above the central horizontal portion of the film, and slightly spaced therefrom, is a horizontal presser plate 46. This is pivotally mounted upon a shaft 47 that extends horizontally between the pair of pedestals at the right hand end of the machine. The presser plate carries a transverse dove-tailed presser bar 48 slightly projecting from its under surface above stencil 41, and adapted thereby to press the film against said stencil and to hold it there while it is being sprayed or treated. The presser plate is normally held in a slightly elevated position, as by means of springs 49 in co-action with lugs 50 on the sides of the presser plate. At the extreme left hand free end, the presser plate is provided with a pair of downwardly extending bars 51, spanned at their lower ends by a transverse horizontal roller shown by dotted lines 52, the roller being below and just clear of the film when the presser plate is depressed, and being adapted to raise the film from the stencil block when the presser plate is elevated.

For operating presser plate 46, I provide a rocker-plate 53, centrally pivoted at 54 at the upper end of a pair of bars 55 that extend upwardly from bed plate 40. The left hand end of the rocker-plate carries a pair of rollers 56 upon a horizontal shaft 57. These are vertically above the center line of stencil block 41 and presser bar 48. The right hand end of the rocker-plate is offset toward the rear, and carries an outboard roller 58, by means of which it is operated. Roller 58 engages a cam 59 upon shaft 25, and the rocker plate is operated thereby. Cam 59 has circular peripheral portions subtending approximately 90 degrees each, and forming two pairs of diametrical opposite cylindrical surfaces of different diameters, those of larger diameter being indicated at 60, and those of smaller diameter being indicated at 61. Thus, when the cam is revolved, surfaces 60 in cooperation with roller 58 will cause the left hand end of the rocker-plate to be depressed, and in turn to depress presser plate 46. This will result in the film being gripped between stencil block 41 and presser bar 48. Subsequent rotation of cam 59 allows roller 58 to drop downwardly upon surfaces 61, and then springs 49 will elevate the left hand end of the presser plate.

A suitable and convenient form of spraying apparatus is indicated by arrow 62. This is located in such a manner that a spray 63 may be directed upwardly through openings 44 and 45, against the under surface of the film. Such spraying apparatus is provided with a fluid inlet pipe 64, a compressed air pipe 65, and valve stems 66 and 67, the latter being adapted for actuation by a lever 68 that is pivoted at 69. For operating this spraying apparatus, I provide a suitable cam 70, centrally mounted upon drive shaft 25 and cooperating with a roller 71 at the upper end of a rock bar 72. The latter is centrally pivoted upon a shaft 73 extending between the right hand pair of pedestals. The lower end of this rock bar is connected to lever 68 by means of a rod 74, and the latter is adjustable as to length, by means of a turn buckle 75. A tension spring 76 maintains engagement between cam 70 and roller 71.

Film roller 15 is adjustably positioned as to its angularity upon its shaft 77. This may be accomplished by means of an end-plate 78 that is affixed to shaft 77 and that has a circular slot 79 therethrough. Roller 15 is free to revolve on its shaft, and is caused to have its angular relation thereto fixed by means of screw 80 that extends into the roller through slot 79, and thereby causes an end of the roller to be gripped by the inner face of plate 78. The other film rollers 13, 14 and 16, are affixed to their respective shafts.

From the foregoing description it will be obvious that, if the various portions of the apparatus are properly proportioned and adjusted, a film may be fed through the machine at a uniform rate when pulley 26 is caused to rotate uniformly. During the progress of the film through the machine, its intermediate portion will be caused to move intermittently. During the intermittent periods of rest, the film will be compressed against a stencil block, and its underside will be sprayed through the block. Pressure of the film against the stencil block will then be released, roller 52 will raise it away from the block, and the intermediate portion of the film will then be advanced a proper amount and the above operations will be repeated. The film after passing through the machine, and after being thus treated therein, will be in the form indicated diagrammatically in Fig. 7, wherein spaced areas 81 have been sprayed.

A peep hole 82 is provided in presser plate 46, to enable areas 81 to be properly located before operation starts. The peep hole is provided with setting marks 83, and the film may be longitudinally positioned to coincide with these marks by means of the circular slot 79 and screw 80.

It will be obvious that various departures in the arrangement of the elements of my apparatus, the proportion of its parts, and the manner in which the parts cooperate, may be made, without departing from the spirit of the invention, or its scope. Many such departures and variations are contemplated by me to meet special conditions. Thus any desired spacing of the treated portions 81 of the film may be had, as well as any size or shape of the treated portions. Moreover any desired number of treated areas within reasonable limits may be produced for each revolution of pulley 26. The angular positioning of cams 59 and 70 must, of course, be properly adjusted, so that film 35 may be gripped between the stencil block and presser bar after it ceases to move, and be released before it is again moved. The spray must be operated after the film is gripped, and must cease to operate before the film is released.

Having thus fully described my invention, I claim:

1. A device of the character described, comprising; means for imparting a uniformly intermittent longitudinal movement to a portion of a film strip therein; a stationary perforate stencil having its face parallel and closely adjacent to the path of said film portion; means for pressing said film portion, during its periods of rest, against said stencil; means for treating the film exposed through the stencil, while it is being thus pressed; and positive means for spacing the film from said stencil after said treatment, and before it can again be moved longitudinally.

2. A device of the character described, comprising; sprocket means for engaging a portion of a film strip therein, for imparting a uniformly intermittent longitudinal movement thereto; a stationary perforate stencil having its face parallel and closely adjacent to the path of said film portion; a movable presser-plate whereby said film portion, during its periods of rest, may be pressed against said stencil; means for treating the surface of the film exposed through the stencil, while the film is being thus pressed; and a roller adjacent the stencil whereby the film may be positively spaced from the stencil after said treatment, and before it can again be moved longitudinally.

3. A device of the character described, comprising; sprocket means for engaging a portion of a film strip therein, for imparting a uniformly intermittent longitudinal movement thereto, and for holding the film stationary between said movements; a stationary perforate stencil having its face parallel and closely adjacent to the path of said film portion; a movable presser-plate whereby said film portion, during its periods of rest, may be pressed against said stencil; means for treating the surface of the film exposed through the stencil, while the film is being thus pressed; a roller adjacent the stencil whereby the film may be positively spaced from the stencil after said treatment, and before it can again be moved longitudinally; and adjustment means whereby the recurring engagements between the film and stencil may be made to occur at any pre-determined positions upon the film.

4. A device of the character described, comprising; sprocket means for engaging a portion of a film strip therein, for imparting a uniformly intermittent longitudinal movement thereto in a horizontal plane, and for holding the film stationary between said movements; a stationary perforate stencil having its face horizontal and closely adjacent to the path of said film portion therebelow; a movable presser-plate above said film portion, whereby the latter, during its periods of rest, may be pressed against said stencil; means for spraying the under surface of the film exposed through the stencil, while the film is being thus pressed; a horizontal roller adjacent the stencil beneath the film, whereby the film may be raised from the stencil after said spraying, and before it can again be moved longitudinally; and adjustment means whereby the recurring engagements between the film and stencil may be made to occur at any pre-determined positions along the length of the film.

5. The construction set forth in claim 1, in combination with means for varying the pressure of the recurring engagements between the film and said stencil.

WILLIAM V. D. KELLEY.